United States Patent
Griffiths et al.

(10) Patent No.: US 7,342,222 B2
(45) Date of Patent: Mar. 11, 2008

(54) METHOD AND APPARATUS FOR DOWNHOLE SPECTROSCOPY PROCESSING

(75) Inventors: Roger Griffiths, Abu Dhabi (AE); Jack Horkowitz, Houston, TX (US); Kai Hsu, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 273 days.

(21) Appl. No.: 10/541,091

(22) PCT Filed: Nov. 21, 2003

(86) PCT No.: PCT/EP03/13147

§ 371 (c)(1),
(2), (4) Date: Jun. 29, 2005

(87) PCT Pub. No.: WO2004/059344

PCT Pub. Date: Jul. 15, 2004

(65) Prior Publication Data

US 2006/0091307 A1    May 4, 2006

(30) Foreign Application Priority Data

Dec. 31, 2002    (EP) .................................. 02293281

(51) Int. Cl.
*G01V 5/04*    (2006.01)
*G01V 5/10*    (2006.01)

(52) U.S. Cl. .................................... 250/262; 250/269.8
(58) Field of Classification Search ................ 250/262, 250/269.8
See application file for complete search history.

(56) References Cited

U.S. PATENT DOCUMENTS 4,464,569 A * 8/1984 Flaum ....................... 250/269.6
5,086,224 A * 2/1992 Roscoe et al. ............ 250/269.2

* cited by examiner

*Primary Examiner*—Mindy Vu
(74) *Attorney, Agent, or Firm*—James Kurka; Bryan L. White

(57) ABSTRACT

A method for downhole spectroscopy processing is described. The method includes: obtaining raw spectroscopy data using a downhole tool; processing the raw spectroscopy data using the downhole tool to obtain a downhole processed solution; transmitting the downhole processed solution to a surface processing system; and using the surface processing system to determine lithology information from the downhole processed solution. A downhole tool for processing raw spectroscopy data is also described. The tool includes: a neutron source; at least one detector for detecting the raw spectroscopy data; processing means for processing the raw spectroscopy data to produce a downhole processed solution; and means for transmitting the downhole processed solution to a surface location.

12 Claims, 9 Drawing Sheets

| DRILLING TIME | LITHO. | SAMPLE DESCRIPTION |
|---|---|---|
| | | Comments |
| 51 | | Comments |
| | | Comments |
| | | Comments |
| 53 | | Comments |
| | | Comments |
| | | Comments |
| 55 | | Comments |
| | | Comments |

FIGURE 3

METHOD AND APPARATUS FOR DOWNHOLE SPECTROSCOPY PROCESSING

BACKGROUND OF INVENTION

Well logs are measurements, typically with respect to depth, of selected physical parameters of earth formations penetrated by a wellbore. Well logs are typically recorded by inserting various types of measurement instruments disposed on an integrated measurement platform into a wellbore, moving the instruments along the wellbore, and recording the measurements made by the instruments. One type of well log recording includes lowering the instruments at the end of an armored electrical cable, and recording the measurements made with respect to the length of the cable extended into the wellbore. These are known as "wireline" measurements. Depth within the wellbore is inferred from the extended length of the cable. Recordings made in this way are substantially directly correlated to measurement depth within the wellbore. Other methods for measurement include a "logging while drilling" (LWD) method, a measurement while drilling (MWD), and a memory logging method. The LWD method involves attaching the instruments to the lower portion of a drilling tool assembly used to drill the wellbore. LWD and wireline tools are typically used to measure the same sort of formation parameters, such as density, resistivity, gamma ray, neutron porosity, sigma, ultrasonic measurement, etc. MWD tools are typically used to measure parameters closely associated with drilling, such as well deviation, well azimuth, weight-on-bit, mud flow rate, annular borehole pressure, etc.

The aforementioned well logging tools may be conveyed into and out of a well via wireline cable, drilling pipe, coiled tubing, slickline, etc. Further, LWD and MWD measurement methods allow for measurement in the drill string while the bit is cutting, or measurement while tripping down or up past a section of a borehole that had been drilled at a previous time.

A major distinction between measurements taken using wireline tools and measurements taken using LWD/MWD tools is the ability to get the raw data back to the surface. With a wireline tool, all of the raw data can be sent directly to the surface via the armored cable. However, in the LWD/MWD environment, there is no physical communication medium connecting the tool to the surface. The typical means of communication between the tool and the surface is via mud pulse telemetry, wherein the pressure of the drilling fluid (mud) flowing through the interior of the drilling tool assembly is modulated to convey information. This is an extremely narrow bandwidth communication channel. Accordingly, only small amounts of information can be conveyed to the surface. Larger amounts of data must be stored in the tool for later retrieval at the surface.

FIG. 1 shows a typical manner in which well log data are acquired in the wireline environment. An assembly or "string" of well log instruments (including logging sensors or "sondes" (8, 5, 6 and 3) as will be further explained) is lowered into a wellbore (32) drilled through the earth (36) at one end of an armored electrical cable (33). The cable (33) is extended into and withdrawn from the wellbore (32) by means of a winch (11) or similar conveyance known in the art. The cable (33) transmits electrical power to the instruments (including logging sensors 8, 5, 6, 3) in the string, and communicates signals corresponding to measurements made by the instruments (including logging sensors 8, 5, 6, 3) in the string to a recording unit (7) at the earth's surface. The recording unit (7) includes a device (not shown) to measure the extended length of the cable (33). Depth of the instruments (including logging sensors 8, 5, 6, 3) within the wellbore (32) is inferred from the extended cable length. The recording unit (7) includes equipment (not shown separately) of types well known in the art for making a record with respect to depth of the instruments within the wellbore (32).

The logging sensors (8, 5, 6, and 3) may be of any type known in the art. These include gamma ray sensors, neutron porosity sensors, electromagnetic induction resistivity sensors, nuclear magnetic resonance sensors, and gamma-gamma (bulk) density sensors. Some logging sensors, such as (8, 5, and 6) are contained in a sonde "mandrel" (axially extended cylinder) which may operate effectively near the center of the wellbore (32) or displaced toward the side of the wellbore (32). Others logging sensors, such as a density sensor (3), include a sensor pad (14) disposed to one side of the sensor housing (13) and have one or more detecting devices (17) therein. In some cases, the sensor (3) includes a radiation source (18) to activate the formations proximate the wellbore (32). Such logging sensors are typically responsive to a selected zone (9) to one side of the wellbore (32). The sensor (3) may also include a caliper arm (15), which serves both to displace the sensor (3) laterally to the side of the wellbore (32) and to measure an apparent internal diameter of the wellbore (32).

FIG. 2 shows a typical configuration for acquiring well log data using a logging while drilling (LWD) and measurements while drilling (MWD) system (39). The LWD/MWD system (39) may include one or more collar sections (44, 42, 40, 38) coupled to the lower end of a drill pipe (20). The LWD/MWD system (39) includes a drill bit (45) at the bottom end to drill the wellbore (32) through the earth (36). In this example, drilling is performed by rotating the drill pipe (20) by means of a rotary table (43). However, drilling may also be performed by top drives or coiled tubing drilling or downhole motors or with rotary steerable systems. During rotation, the pipe (20) is suspended by equipment on a drill rig (10) including a swivel (24), which enables the pipe (20) to rotate while maintaining a fluid tight seal between the interior and exterior of the pipe (20). Mud pumps (30) draw drilling fluid ("mud") (26) from a tank or pit (28) and pump the mud (26) through the interior of the pipe (20), down through the LWD/MWD system (39), as indicated by arrow (41). The mud (26) passes through orifices (not shown) in the bit (45) to lubricate and cool the bit (45), and to lift drill cuttings through an annulus (34) between the pipe (20), LWD/MWD system (39), and the wellbore (32).

The collar sections (44, 42, 40, 38) include logging sensors (not shown) which make measurements of various properties of the earth formations through which the wellbore (32) is drilled. These measurements are typically recorded in a recording device (not shown) disposed in one or more of the collar. LWD systems known in the art typically include one or more logging sensors (not shown) which measure formation parameters, such as density, resistivity, gamma ray, neutron porosity, sigma, etc. as described above, which may be used to determine formation lithology, etc. MWD systems known in the art typically include one or more logging sensors (not shown) which measure selected drilling parameters, such as inclination and azimuthal trajectory of the wellbore (32). MWD systems also provide the telemetry (communication system) for any MWD/LWD tool logging sensors in the drill string.

The LWD/MWD system (39) typically includes a mud pressure modulator (not shown separately) in one of the collar sections (44). The modulator (not shown) applies a telemetry signal to the flow of mud (26) inside the system (39) and pipe (20) where the telemetry signal is detected by a pressure sensor (31) disposed in the mud flow system. The pressure sensor (31) is coupled to detection equipment (not shown) in the surface recording system (7A), which enables recovery and recording of information transmitted in the telemetry scheme sent by the MWD portion of the LWD/MWD system (39). The telemetry scheme includes a subset of measurements made by the various logging sensors (not shown separately) in the LWD/MWD system (39). The majority of the measurements made by the logging sensors in the LWD/MWD system (39) are not retrieved until the system is withdrawn from the wellbore.

One formation parameter that is of particular interest to the drilling operator is formation lithology. "Lithology" refers to the physical character and composition of the rock. Thus, a lithologic log indicates the different rock strata within the formations penetrated by the borehole. Once a hole has been drilled, a lithologic log may be produced by obtaining formation spectroscopy data using a wireline neutron tool, and subsequently processing the data at the surface to provide the desired log. However, this process is of no use while the hole is being drilled. To give the drilling operator a picture of the lithology as the hole is being drilled, it is conventional to examine the drill cuttings brought to the surface by the circulated drilling mud. This process generates what is known as a "mud log".

An example of a conventional, manually-generated mud log is shown in FIG. 3. In this log, drilling time is recorded in area 51 at 2-foot intervals, and time is recorded in minutes per foot. This information is important as it gives the operator information some basic information about what type of rock is being drilled through (some rocks, e.g., shales, drill "slow", while others, e.g., limestone, drill "fast"). In the next area (53), titled "litho", the mud logger uses standard symbols and colors to indicate the type of rock that is being drilled based upon the well cuttings. In the third area (55), the mud logger provides a written description of the samples he or she has examined. The last step is for the mud logger to pick and note formation horizons. On this log, the "L-1", "L-2", and "Neva" formations are indicated.

An example of a more modern yet conceptually analogous mud log is shown in FIG. 4. In this log, the drilling time data in area 51 and the pictorial representation of the lithology in area 53 are generated by computer. However, the mud logger still has to manually examine the cuttings to provide the notations in area 55.

Regardless of what type of mud log is used, conventional mud logs have certain limitations. For example, as the depth of the hole increases, the latency of the log, i.e., the time between when the actual cutting occurs and when the corresponding cuttings are circulated to the surface, becomes large. In addition, the cuttings from different depths may become commingled in the mud, giving an inaccurate representation of the formation.

As noted previously, once the hole has been drilled, other types of spectroscopy-derived lithology information may be obtained using a wireline tool. In the conventional wireline-conveyed measurement, the entire measured gamma-ray energy spectrum is transmitted to the surface, where it is processed to derive elemental yields and subsequent lithological indicators. This is possible in the wireline environment because of the transmission bandwidth available through the electrical conductors of the wireline. Information obtained from the mud log typically will be considered together with information obtained using wireline tools to determine whether to complete the hole.

An example of a known surface spectroscopy processing technique is described below. In general, however, it should be understood that spectroscopy processing requires a large amount of raw data; an amount of data that greatly exceeds the transmission bandwidth in a typical LWD/MWD system. In addition, conventional spectroscopy processing requires operator input to guide the processing and ultimately produce a lithology model. For both of these reasons, in the LWD/MWD environment, spectroscopy processing is something that conventionally has only been done at the surface and after the tool has been retrieved from the hole.

FIG. 5 shows a flow diagram of the typical steps involved in surface spectroscopy processing. Initially, the raw spectral data is acquired by a downhole tool (Step 400). The downhole tool may include such tools as a Reservoir Saturation Tool (RST), a Combinable Production Logging Tool (CPLT), etc. (RST and CPLT are marks of Schlumberger). The raw spectral data is then pre-processed (Step 402). Pre-processing includes determining foreground and background spectra as well as accumulation and background subtraction. The result of the pre-processing is a net capture spectrum. The net capture spectrum is subsequently processed using spectral stripping (Step 404). During spectral stripping, the elemental yields, offsets, and gains are calculated using the net capture spectra and the depth information (406).

The results from the spectral processing are then used for borehole logic processing (Step 408). During the borehole logic processing, depth information (406) and data from other well logging tools (410) may be used in conjunction with the spectroscopy information to identify the composition of the drilling mud system, and allow for corrections to be made as necessary. In some cases user intervention (412) may be required to facilitate the borehole logic processing. The elemental yields calculated during spectral stripping (Step 404) are re-distributed, as required, based on the results of the borehole logic processing (Step 414). The re-distributed yields are then used in pre-spectroscopy to lithology processing to correct the calculated sulfur and iron yields, filter the elemental yields, compute the apparent salinity, and baseline certain yields in preparation for further processing (416). Oxides closure processing is subsequently performed to determine the dry weight elemental concentrations of particular elements, such as silicon, calcium, sulfur, iron, titanium, etc. (Step 418). The dry weight elemental concentrations are then used in spectroscopy-to-lithology processing to determine the dry weights of clay, carbonate, quartz-feldspar-mica (QFM), pyrite, anhydride, siderite, salt and coal (Step 420). The dry weight elemental concentrations and calculated lithology fractions are also used in formation logic processing to determine the the appropriate clay model (e.g., arenite, sub-arkose, arkose, etc.), sulfur mineral model, and presence of siderite, coal and salt (Step 422).

The results from the spectroscopy-to-lithology processing (Step 420) and the formation logic processing (Step 422) are used to compute matrix properties (Step 424), such as matrix density, matrix neutron, matrix sigma, matrix photoelectric factor, etc. The uncertainties for the dry weight of the elements are subsequently calculated to ensure the robustness of the above calculations (Step 426).

SUMMARY OF INVENTION

In general, in one aspect, the invention relates to a method for downhole spectroscopy processing comprising: obtaining raw spectroscopy data using a downhole tool; processing the raw spectroscopy data using the downhole tool to obtain an downhole processed solution; transmitting the downhole processed solution to a surface processing system; and using the surface processing system to determine lithology information from the downhole processed solution.

In general, in another aspect, the invention relates to a downhole tool for processing raw spectroscopy data, comprising: a neutron source; at least one detector for detecting the raw spectroscopy data; processing means for processing the raw spectroscopy data to produce a downhole processed solution; and means for transmitting the downhole processed solution to a surface location.

Other aspects and advantages of the invention will be apparent from the following description and the appended claims.

BRIEF DESCRIPTION OF DRAWINGS

FIG. 3 shows an example of a manual mud log

DETAILED DESCRIPTION

In the following detailed description of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Using conventional techniques in the wireline environment, lithological information may be determined by transmitting the entire measured gamma-ray energy spectrum to the surface and processing it there. The LWD/MWD environment, due to the limited bandwidth communication channel available, makes it difficult if not impossible to use the above mentioned technique. In the LWD/MWD environment, data compression techniques must be implemented downhole to reduce the amount of information transmitted to the surface. One of the most powerful compression techniques is to convert the raw measurements into intermediate information as close as possible to the information required by the final user. The embodiments of the invention described herein provide downhole processing of spectroscopy data with increased processing power in the downhole tool. The downhole tool, according to one embodiment of the invention, includes processing logic that allows it to run automatically independent of user intervention and certain other external variables, making it possible to perform the spectral stabilization, stripping and subsequent interpretive processing before the data transfer bottleneck of the mud-pulse telemetry system. One advantage is that, rather than transmitting the entire spectrum, derived products (such as lithology proportions and grain responses) are transmitted using substantially fewer bits than would be required for the full spectrum.

Once these derived products, referred to herein as a "downhole processed solutions", are available at the surface, they can be presented in the form of an "instant mud log" service, where the lithology information is presented to the user in a form similar to the traditional mud-cuttings log display but with considerably less latency and significantly improved quantitative information content. One of the uses of this new instant mud log service will be to allow enhanced horizon identification by drilling operators. Depending upon the desired information and the design of the downhole tool itself, in some embodiments a downhole processed solution of the invention may be a final product of interest to the user. In other embodiments, the downhole processed solution may be an intermediate product that will serve as a basis for further processing at the surface.

Figure 1:
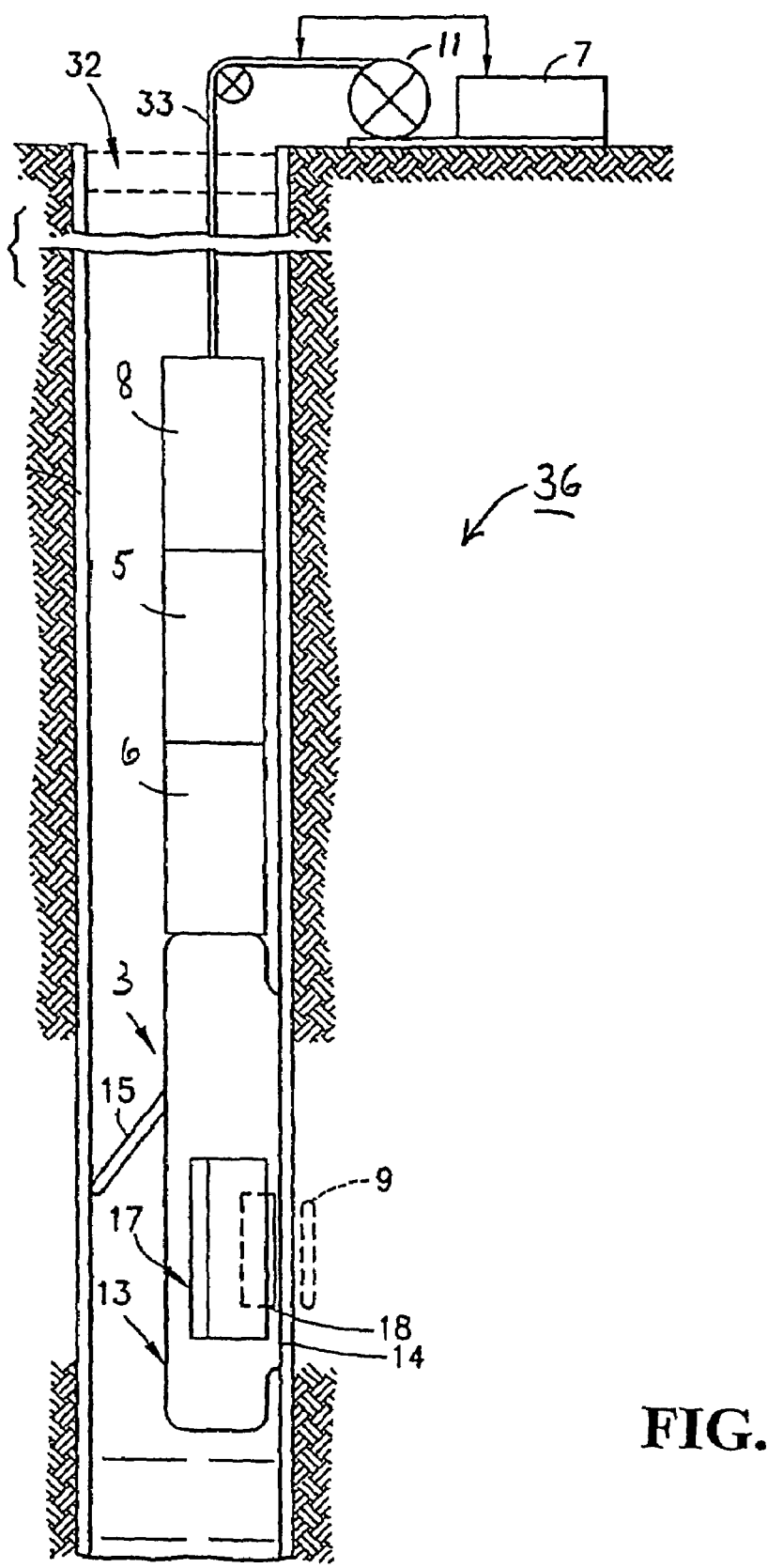
FIG. 1 shows typical well log data acquisition using a wireline-conveyed instrument.
Figure 2:
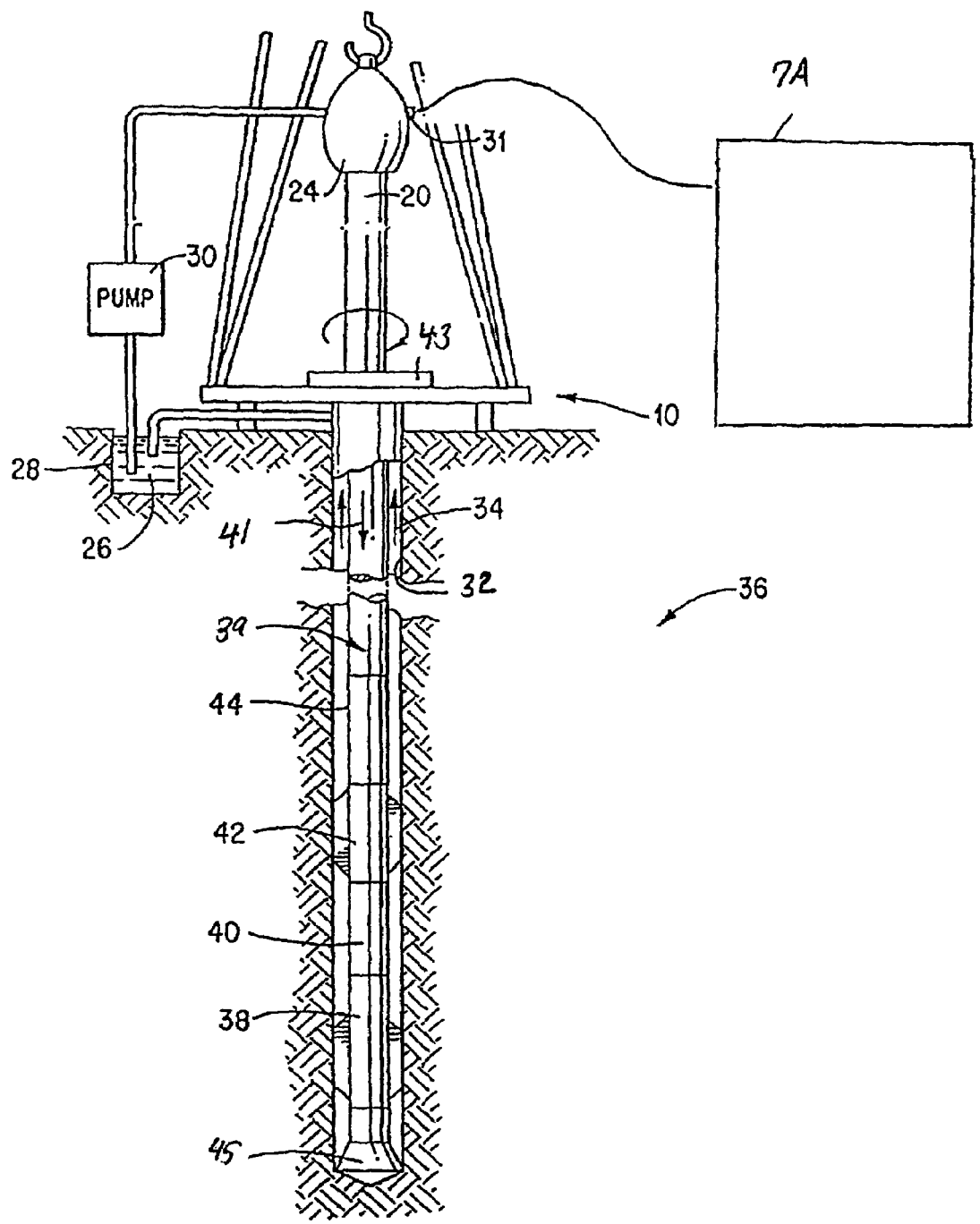
FIG. 2 shows typical well log data acquisition using a logging while drilling/measurement while drilling system.
Figure 4:
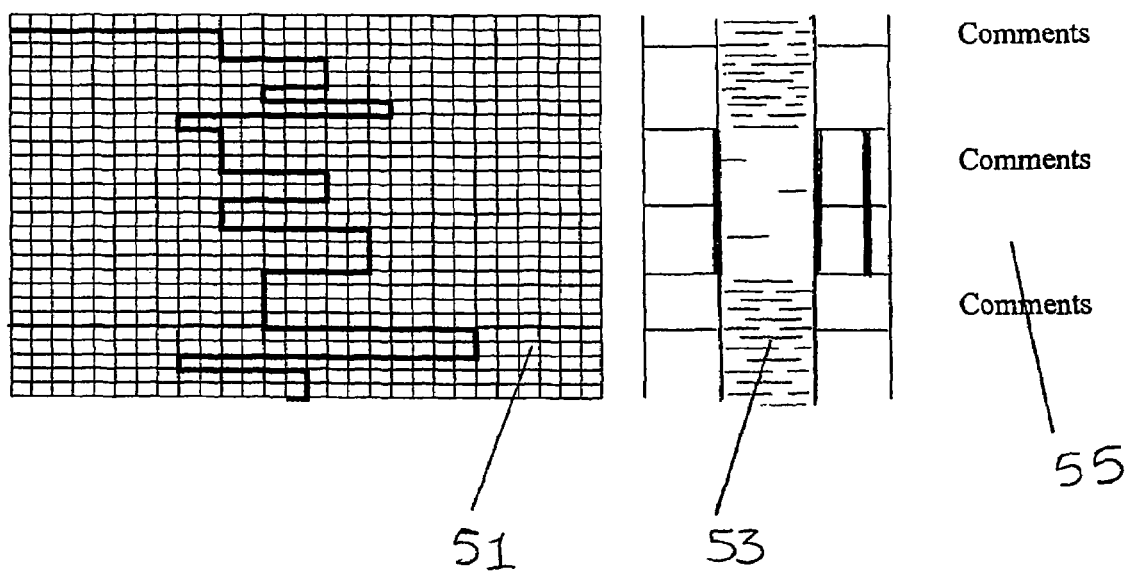
FIG. 4 shows an example of a computer-generated mud log.
Figure 5:
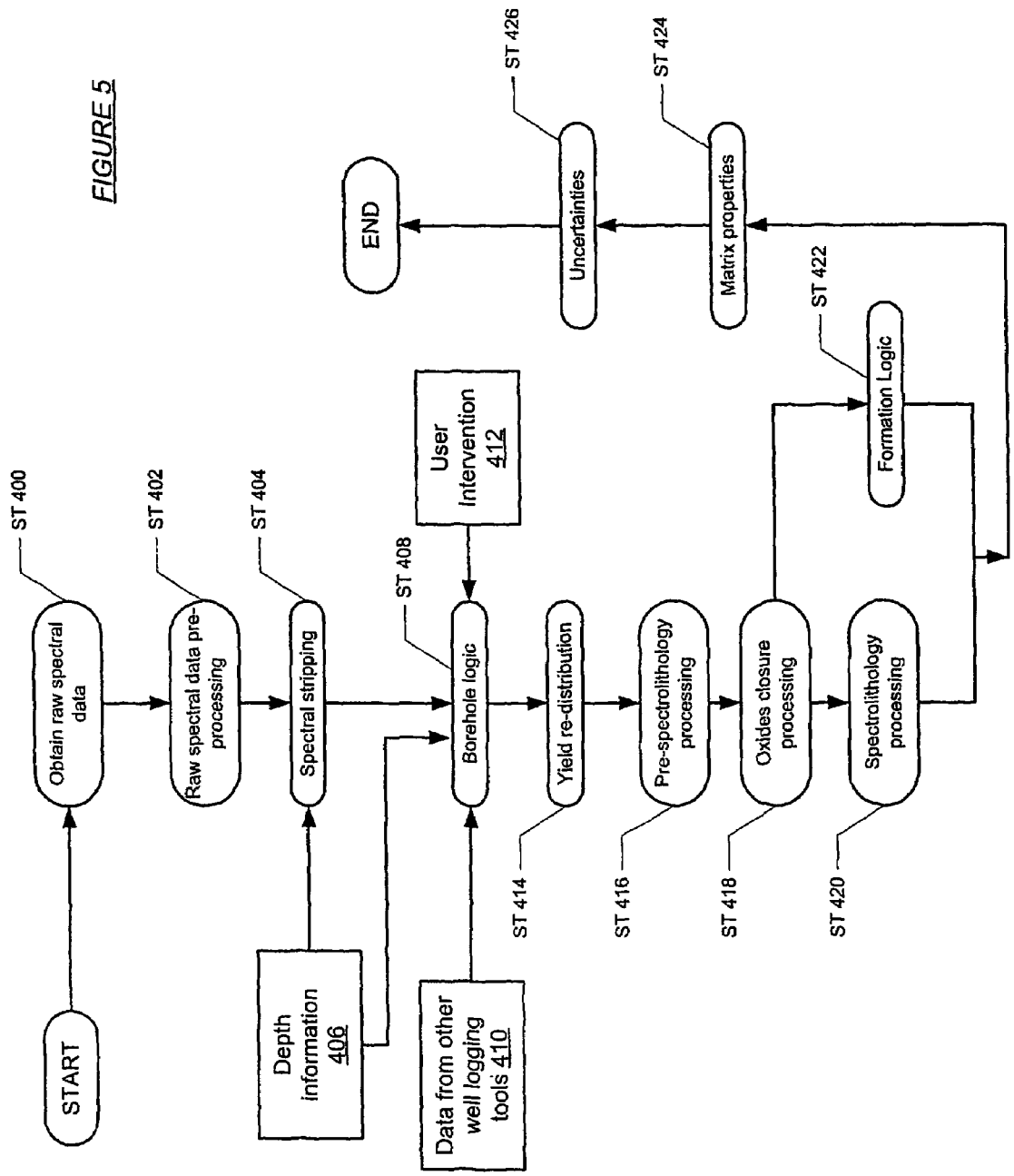
FIG. 5 shows a flow diagram of the typical steps involved in surface spectroscopy processing.
Figure 6:
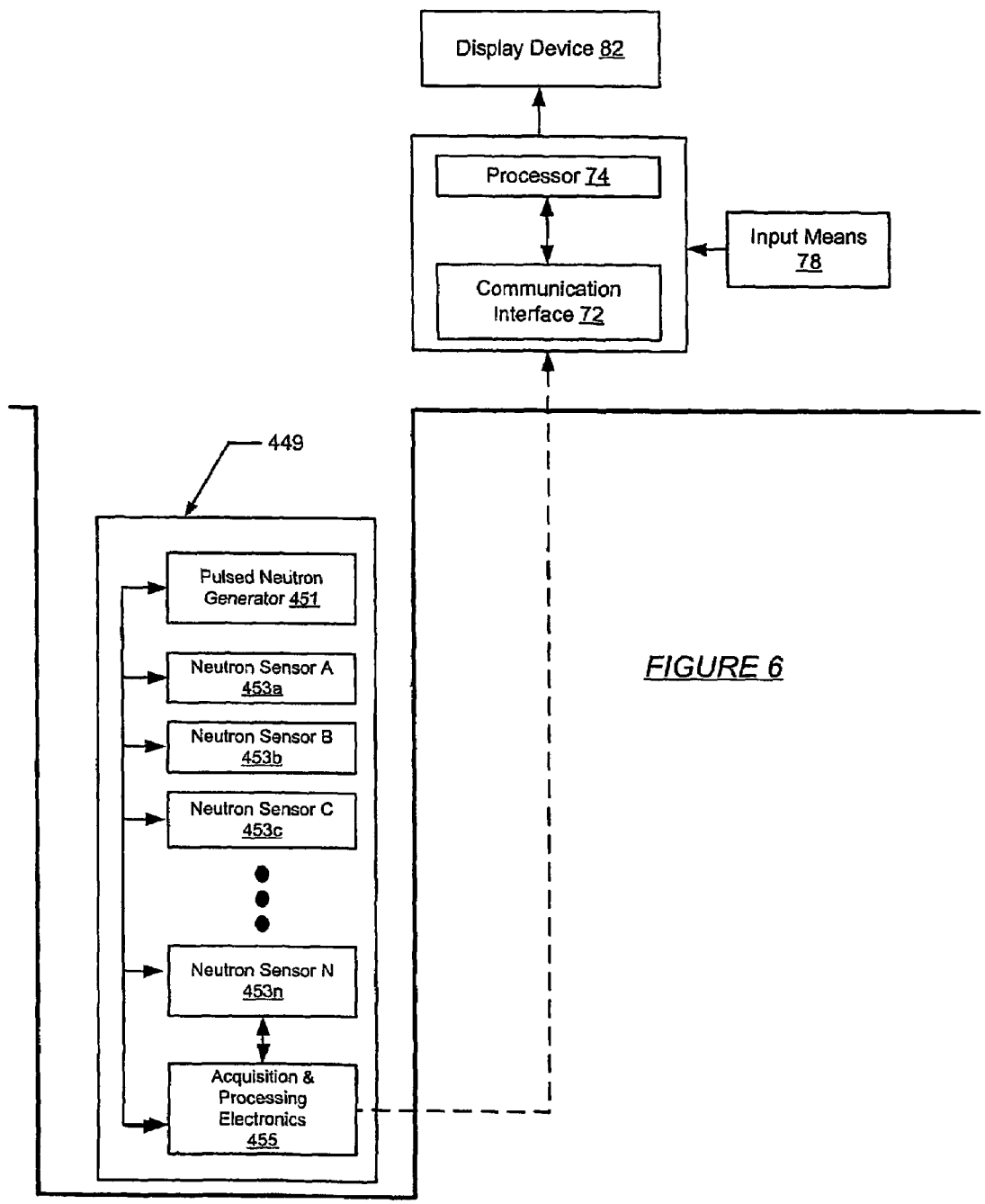
FIG. 6 illustrates a downhole spectroscopy processing system in accordance with one embodiment of the invention.

FIG. 6 illustrates a downhole spectroscopy processing system in accordance with one embodiment of the invention. The system comprises a downhole portion and a surface portion. The downhole portion is designed to be placed on board in a downhole tool (449). The downhole tool may be, for example, an LWD or MWD tool such as that illustrated in prior art FIG. 2. The particular design and characteristics of the tool are not germane here provided that the tool incorporates basic functionality, namely, a source of high energy neutrons from either a Pulsed Neutron Generator (PNG) (451) or a chemical source, and the appropriate sensors to detect the gamma-ray energy spectrum (shown as sensors 453a through 453n). The downhole portion of the system also includes an acquisition and processing electronics module (455), described in more detail below.

The surface portion of the system of this embodiment comprises a communication interface (72) that permits the surface portion to receive and decode information sent by the downhole portion, in addition to a processor (74), a display (82), and an input means (e.g., a keyboard) (78). It will be understood by those skilled in the art that the surface portion of the system may take the form of an ordinary personal computer, or may be a specialized design. Also, the surface portion may comprise a stand-alone computer dedicated to the functionality of this invention, or it may be implemented in a general use system that controls other drilling-related functions.

Figure 7:
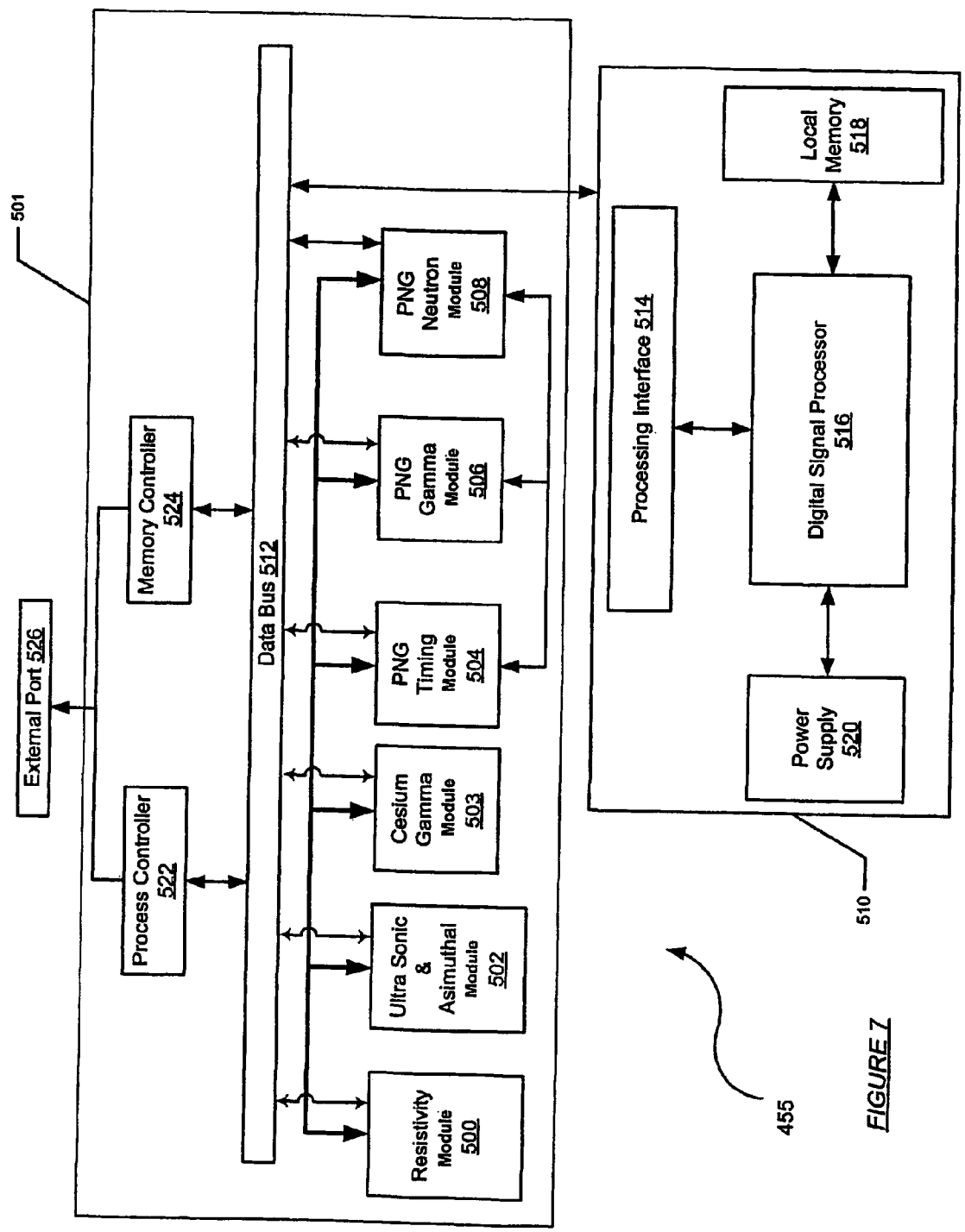
FIG. 7 illustrates acquisition and processing circuitry in accordance with the embodiment of FIG. 6.

An embodiment of the acquisition and processing electronics module (455) is shown in detail in FIG. 7. The module (455) is divided into acquisition and control electronics (501) and a spectroscopy processing module (510). The acquisition and control electronics of this embodiment include a resistivity module (500), an Ultra Sonic & Azimuthal module (502), a Cesium Gamma module (503), a Pulsed Neutron Generator (PNG) Timing module (504), a PNG Gamma module (506), and a PNG Neutron module (508). The PNG Timing module (504) controls the firing of the PNG and synchronizes the PNG gamma module (506) for spectroscopic acquisition. The acquired spectroscopy data is transferred to the spectroscopy processing module (510) via the data bus (512). Control functionality is provided by a process controller (522) and a memory controller (524). Both controllers (552, 524) communicate with the other components (i.e., 502-506) via the data bus (512).

The spectroscopy processing module (510) includes a processing interface (514), such as a control area network (CAN) transceiver, CAN controller, etc. The processing interface (514) facilitates data transfer between the other components (i.e., 502-506) of the acquisition electronics (501) and the spectroscopy processing module (510). The processing interface (514) is connected to a digital signal processor (DSP) (516). The DSP may be of any appropriate type, for example, a 32-bit floating point DSP. The DSP is used to process the acquired spectroscopy data and generate various levels of spectral processing results, or a downhole processed solution. A local memory (518), connected to the digital signal processor (516) is used, as required, by the DSP (516) in the generation of the downhole processed solution. The spectroscopy processing module (510) is powered by a local power supply (520) that is connected to the DSP.

Once the downhole processed solution has been generated, it may be transmitted to the surface via an external port (526) that is connected to the process controller (522) and the memory controller (524). The transmission to the surface is via any conventional or non-conventional means, e.g., mud pulse, wired drillpipe, or other types of telemetry.

It should be understood that although FIG. 7 and the accompanying description above describe one embodiment of acquisition and processing circuitry in accordance with the invention, a skilled artisan would recognize that this functionality could be implemented in many different hardware designs without departing from the spirit and scope of the invention. Thus, this description of one possible hardware implementation is for illustrative purposes only and should in no way limit the scope of the invention.

Figure 8:
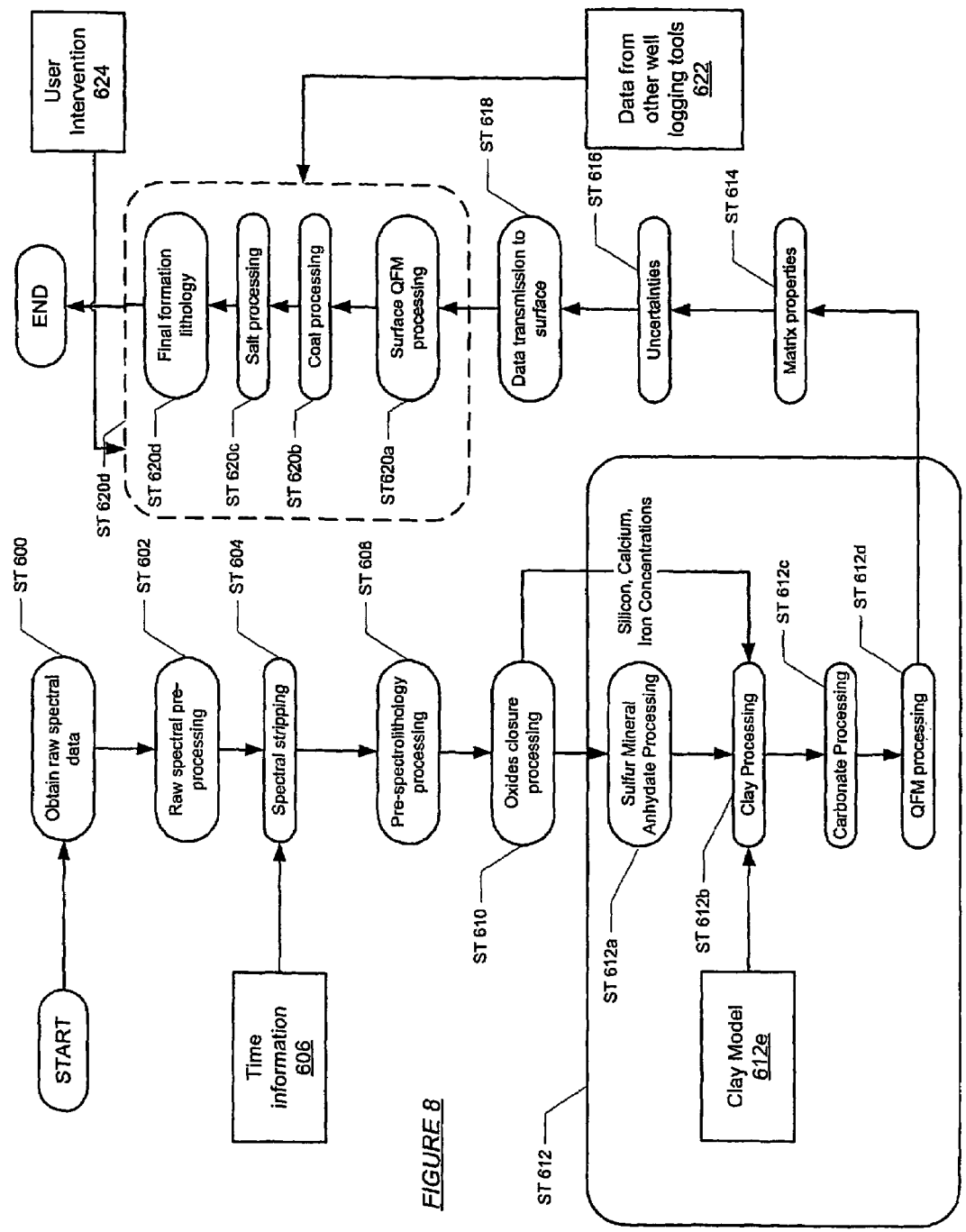
FIG. 8 illustrates a flow diagram in accordance with one embodiment of the invention.

FIG. 8 illustrates a flow diagram in accordance with one embodiment of the invention. Initially, the raw spectral data is acquired by the downhole tool (Step 600). As the raw spectral data is acquired, it is time-stacked to maintain the order in which each portion of the raw spectral data was acquired with respect to time. The raw spectral data is then pre-processed (Step 602). The pre-processing includes determining foreground and background spectra as well as accumulation and background subtraction. The result of the pre-processing is a net capture spectrum, which is subsequently processed using spectral stripping (Step 604). During spectral stripping, the relative yields, offsets, and gains are calculated using the net capture spectra, a set of elemental standards, tool calibration and the time information (Step 606) (e.g., information necessary to convert the time stacked data into data correlated with a depth, such as rate of penetration, start time, etc.). Certain results from the spectral stripping are then corrected during pre-spectrolithology processing based on the results of the borehole processing logic results, such as the correction of the sulfur yield for barite in the drilling mud system, followed by filtering of elemental yields previously calculated (Step 608).

Oxides closure processing is subsequently performed to determine the dry weight elemental concentrations of particular elements, such as silicon, calcium, sulfur, iron, aluminum, etc (Step 610). The dry weight elemental concentrations are then used in spectrolithology processing to determine the dry weights of clay, carbonate, quartz-feldspar-mica (QFM), pyrite, anhydride, siderite, salt and coal (Step 612). More specifically, during spectrolithology processing (Step 612), sulfur mineral processing is initially performed to compute the dry weight of anhydrite and/or pyrite (Step 612a). The dry weight of anhydrite, in addition to the elemental concentrations of silicon, calcium, and iron are used in clay processing (Step 612b). During clay processing (Step 612b) a clay model (612e) is approximated and used to determine the dry weight of clay. The dry weight of QFM is subsequently calculated using QFM processing (Step 612d).

The results from the spectrolithology processing (Step 612) are used to compute matrix properties (Step 614), such as matrix density, matrix neutron, matrix sigma, matrix photoelectric factor, etc. The uncertainties for the dry weight of the elements are subsequently calculated to ensure the robustness of the above calculations (Step 616). At this point, a downhole processed solution has been obtained that has a significantly small bandwidth and is readily transmitted to the surface in real-time (618).

In one embodiment of the invention (i.e., steps 600-616), the downhole processed solution is a preliminary estimate of the downhole lithology that can be accurately determined using spectral analysis. Borehole logic and yield re-distribution typically would not be performed downhole because these processes typically require data from other sensors that may not sample the same formation at the same time as the spectroscopy tools.

At the surface, a surface processing system (620) uses the downhole processed solution along with depth-aligned data from other well logging tools (622) to determine whether lithologies that cannot be detected in a robust manner by spectroscopy alone are present. If data from the additional well logging tools (622) indicates the presence of such lithologies, user intervention (624) is required. User intervention is necessary to determine the type of processing to be applied to the downhole processed solution such that the final formation lithology is consistent with data acquired from all well logging tools currently being used at the wellsite.

More specifically, the surface processing system (620) initially re-computes the QFM concentration using surface QFM processing (Step 620a). Coal processing (Step 620b) and salt processing (Step 620c) are subsequently performed as required. The results of the individual processing components (i.e., steps 620a-620c) in the surface processing system (620) are combined to produce the final formation lithology (Step 620d). Those skilled in the art will appreciate that each of the individual surface processing components may require data from one or more additional well logging tools (622). Further, the individual surface processing components may require user intervention at one or more times during the course of the processing.

Once the lithology information has been determined, the lithology information may be displayed as a strip of various colors of varying widths to indicate the proportions of the lithologies in the section of formation surveyed by the logging system. In one embodiment of the invention, the outputs of the above-described downhole processing system are displayed to the drilling operator via a user interface. By delivering information on the lithology of the formation being drilled faster than is available through conventional mud logging and in a format that can be used by rig floor personnel to identify lithology changes, it is anticipated that rig floor display of this information will permit better drilling decisions to be made.

Figure 9:
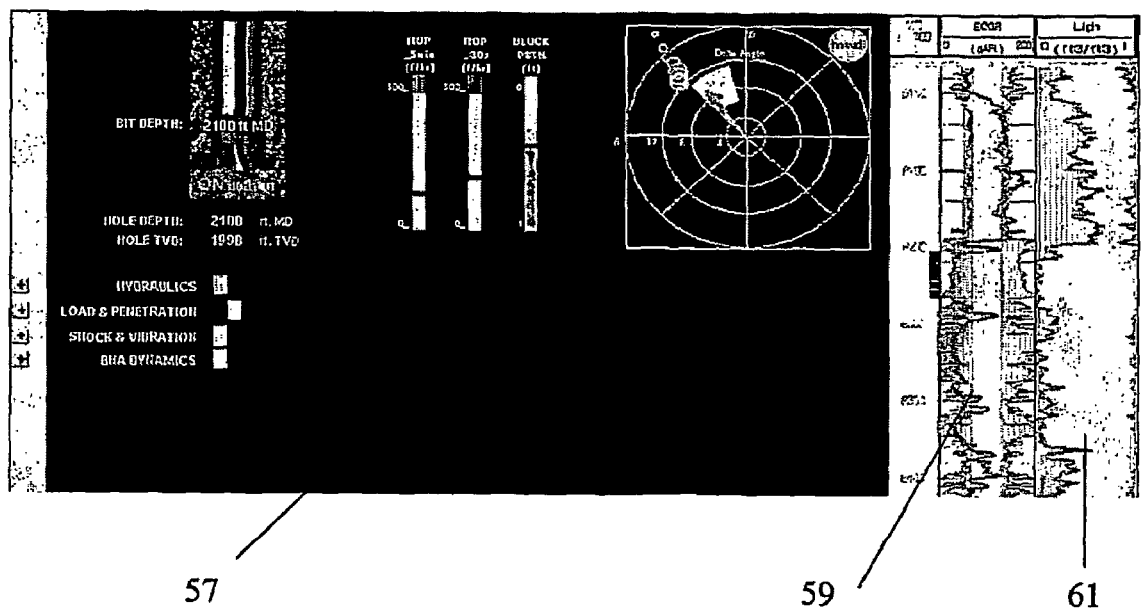
FIG. 9 illustrates a user interface in accordance with one embodiment of the invention.

An example of a user interface in accordance with one embodiment of the invention is shown in FIG. 9. In this embodiment, a drilling operator user interface is shown in area 57. In area 59, information that is traditionally transmitted in real;-time is shown. In this example caliper and Gamma Ray information are displayed. In area 61, the derived lithology information is graphically displayed.

Embodiments of the invention may have one or more of the following advantages. The invention provides the ability to obtain a downhole processed solution by providing automated downhole processing. The downhole processed solution requires a substantially small bandwidth for transfer to the surface. The substantially small bandwidth allows the downhole processed solution to be viewed in real-time at the surface. Embodiments of the invention allow automation of borehole corrections and the selection of appropriate formation mineralogy components. This is accomplished through the use of a suite of algorithms that utilize the spectroscopy and/or additional measurements as necessary. In contrast, most of the existing spectroscopy processing algorithms require the user to manually select from a suite of possible corrections to be made for the borehole fluid system and also select the formation mineral components to solve for, resulting in highly subjective and frequently inaccurate results.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method for downhole spectroscopy processing comprising:
   obtaining raw spectroscopy data using a downhole tool;
   processing downhole the raw spectroscopy data using the downhole tool to obtain a downhole processed solution;
   transmitting the downhole processed solution to a surface processing system; and
   using the surface processing system to determine lithology information from the downhole processed solution
   wherein processing the raw spectroscopy data comprises:
   pre-processing downhole the raw spectroscopy data to obtain a net capture spectra; and
   performing spectral stripping using time information and the net capture spectra to determine elemental yields.

2. The method of claim 1, wherein processing comprises time-stacking the raw spectroscopy data.

3. The method of claim 1, further comprising displaying the lithology information on a user interface.

4. The method of claim 1, wherein processing the raw spectroscopy data further comprises:
   determining dry weight elemental concentrations using the elemental yields;
   determining a dry weight for at least one selected from the group consisting of clay, carbonate, quartz-feldspar-mica, pyrite, anhydride, siderite, salt, and coal using the dry weight elemental concentrations; and
   computing a matrix property using the dry weight elemental concentrations.

5. A downhole tool for processing raw spectroscopy data, comprising:
   at least one detector for detecting the raw spectroscopy data;
   processing means for processing the raw spectroscopy data to produce a downhole processed solution; and
   means for transmitting the downhole processed solution to a surface location,
   wherein the processing means comprises:
   means for pre-processing the raw spectral data to obtain a net capture spectra;
   means for performing spectral stripping using time information and the net capture spectra to determine elemental yields.

6. The downhole tool of claim 5, wherein the processing means comprises means for determining elemental yields.

7. The downhole tool of claim 5, wherein the processing means comprises means for computing a matrix property.

8. The downhole tool of claim 5, wherein the processing means further comprises means for determining dry weight elemental concentrations using the elemental yields.

9. The downhole tool of claim 8, wherein the processing means further comprises:
   means for determining a dry weight for at least one selected from the group consisting of clay, carbonate, quartz-feldspar-mica, pyrite, anhydride, siderite, salt, and coal using the dry weight elemental concentrations; and
   means for computing a matrix property using the dry weight.

10. The downhole tool of claims 5, wherein the processing means comprises:
    a digital signal processor (516);
    a power supply (520) operatively connected to the digital signal processor (516);
    a local memory (518) operatively connected to the digital signal processor (516); and
    a processing interface (514) operatively connected to the digital signal processor (516).

11. A method for downhole spectroscopy processing comprising:
    obtaining raw spectroscopy data using a downhole tool;
    processing downhole the raw spectroscopy data using the downhole tool to obtain a downhole processed solution;
    transmitting the downhole processed solution to a surface processing system; and
    using the surface processing system to determine lithology information from the downhole processed solution;
    comparing the downhole processed solution with data obtained from another downhole tool; and
    wherein processing the raw spectroscopy data comprises:
    pre-processing downhole the raw spectroscopy data to obtain a net capture spectra; and
    performing spectral stripping using time information and the net capture spectra to determine elemental yields.

12. A downhole tool for processing raw spectroscopy data, comprising:
    at least one detector for detecting the raw spectroscopy data;
    processing means for processing the raw spectroscopy data to produce a downhole processed solution; and
    means for transmitting the downhole processed solution to a surface location,
    wherein the processing means comprises:
    means for pre-processing the raw spectral data to obtain a net capture spectra;
    means for performing spectral stripping using time information and the net capture spectra to determine elemental yields; and
    means for comparing the downhole processed solution with data obtained from another downhole tool.

* * * * *